United States Patent
Chien

(10) Patent No.: US 8,134,764 B2
(45) Date of Patent: Mar. 13, 2012

(54) IMAGE PROCESSING DEVICE WITH A CSA ACCUMULATOR FOR IMPROVING IMAGE QUALITY AND RELATED METHOD

(75) Inventor: Hung-Lun Chien, Taipei Hsien (TW)

(73) Assignee: Princeton Technology Corporation, New Taipei (TW)

( * ) Notice: Subject to any disclaimer, the term of this patent is extended or adjusted under 35 U.S.C. 154(b) by 1496 days.

(21) Appl. No.: 11/567,747

(22) Filed: Dec. 7, 2006

(65) Prior Publication Data

US 2007/0211316 A1  Sep. 13, 2007

(30) Foreign Application Priority Data

Mar. 7, 2006  (TW) ............................... 95107598 A

(51) Int. Cl.
*H04N 1/46* (2006.01)
(52) U.S. Cl. ......... 358/530; 358/527; 358/1.9; 345/643; 380/30
(58) Field of Classification Search .................. 358/527, 358/1.9; 345/643; 380/30
See application file for complete search history.

(56) References Cited

U.S. PATENT DOCUMENTS

| | | | | |
|---|---|---|---|---|
| 4,680,626 A * | 7/1987 | Deering et al. | ............... | 358/523 |
| 5,345,541 A * | 9/1994 | Kelley et al. | ................. | 345/426 |
| 5,381,359 A * | 1/1995 | Abbott et al. | ................. | 708/322 |
| 6,989,843 B2 * | 1/2006 | Naegle et al. | ................. | 345/643 |
| 2004/0252829 A1 * | 12/2004 | Son | ................................ | 380/30 |
| 2005/0165878 A1 | 7/2005 | Kwon | | |

FOREIGN PATENT DOCUMENTS

| | | |
|---|---|---|
| GB | 2 332 985 A | 7/1999 |
| JP | 9149424 | 6/1997 |
| JP | 2005218094 | 8/2005 |

* cited by examiner

*Primary Examiner* — Twyler Haskins
*Assistant Examiner* — Michael Burleson
(74) *Attorney, Agent, or Firm* — Winston Hsu; Scott Margo

(57) ABSTRACT

An image processing device includes a CSA accumulator, a first register, a CPA adder and a central processing unit. The CSA accumulator includes a first input for receiving a processing signal and a second input for receiving a previous result of the CSA accumulator. The first register includes an input coupled to the CSA accumulator and an output coupled to the second input end of the CSA accumulator. The CPA adder is coupled to the first register. The CPA adder is used for processing an addition operation on all carries outputted from the first register. The central processing unit includes an input coupled to the CPA adder and an output end for outputting an output signal comprising processed image measurement data.

7 Claims, 7 Drawing Sheets

IMAGE PROCESSING DEVICE WITH A CSA ACCUMULATOR FOR IMPROVING IMAGE QUALITY AND RELATED METHOD

BACKGROUND OF THE INVENTION

1. Field of the Invention

The present invention relates to image processing devices and related methods for improving image quality, and more particularly, to an image processing device and related method for improving image quality with a Carry-Save-Add (CSA) accumulator.

2. Description of the Prior Art

In digital cameras, digital video cameras, and liquid crystal display (LCD) monitors, color brightness and image stability can be increased by measuring information of original images as a basis for adjustment. Ideally, the information of an entire image would be measured, however insufficient clock speed becomes a problem when gathering the information of the entire image. In the prior art solution, an image is divided into a plurality of frames and a characteristic of each frame is calculated one at a time. This method is effective for static images. However, in dynamic digital video cameras and LCD monitors, a new solution is necessary.

An operating principle of CRT and LCD monitors is generating complete frame control through a horizontal synchronization signal (Hsync) and a vertical synchronization signal (Vsync). An image signal can be produced at an appropriate moment to produce an image on the monitor. Within an image, each frame is produced by an electron gun. After scanning one scan line, the electron gun returns to the beginning of the scan line. Therefore, an image processing device must include a horizontal synchronization signal that tells the electron gun to return after scanning one scan line. After scanning a complete frame, the image processing device outputs the vertical synchronization signal to send the electron gun back to an original vertical position.

Please refer to FIG. 1. FIG. 1 is a diagram of an image processing device for processing image measurement data according to the prior art. After scanning one scan line, the image processing device outputs a horizontal synchronization signal Hsync (the signal Hsync is logic low). After scanning a frame, the image processing device outputs a vertical synchronization signal Vsync (the signal Vsync is logic low). A clock CLK is a signal with a clock period T. During a period of scanning one scan line (the signal Hsync is logic high), the image processing device processes carry-propagate addition (CPA) on image measurement data of a pixel once within the clock period T. A complete addition operation, which includes generating a sum and a carry out, is processed. During a following clock period T, the image processing device processes another complete carry-propagate addition.

Please refer to FIG. 2, which is a diagram of a Carry-Propagate-Adder 22. The Carry-Propagate-Adder 22 includes three inputs. The first input 222 of the Carry-Propagate-Adder 22 is used for receiving a summand $A_1$, the second input 224 is used for receiving a sum input $S_{in}$ from a preceding Carry-Propagate-Adder, and the third input 226 is used for receiving a carry input $C_{in}$ from the preceding Carry-Propagate-Adder. The Carry-Propagate-Adder 22 includes two outputs. A first output 228 of the Carry-Propagate-Adder 22 is used for outputting a sum output $S_{out}$, and a second output 229 is used for outputting a carry output $C_{out}$. The Carry-Propagate-Adder 22 is used for processing addition on data received from the three inputs. A logic operation of the sum output $S_{out}$ is $S_{out}=A_1 \wedge S_{in} \wedge C_{in}$, which is processing a "NOR" operation on data received from the three inputs. A logic operation of the carry output $C_{out}$ is $C_{out}=A_1 S_{in} | A_1 C_{in} | S_{in} C_{in}$, which is processing an "AND" operation two-by-two and finally processing an "OR" operation.

In the prior art, the image processing device must process a complete carry-propagate addition within each clock period T, which wastes time. Because current clock speeds are too slow to process image measurement data, an image is divided into several frames to gather information for the whole image. Processing an addition operation on each individual frame and adjusting the individual frames one-by-one leads to poor image quality. If better image quality is required, a complete carry-propagate addition operation must be processed on the image measurement data of the whole image. This improves image quality, but requires more operation time. Therefore, to improve operation speed and to perform more operations within a finite period of time becomes a bottleneck of improving image quality.

SUMMARY OF THE INVENTION

An image processing device for improving image quality according to an embodiment of the present invention includes a Carry-Save-Add (CSA) accumulator, a first register, a Carry-Propagate-Adder (CPA) and a central processing unit (CPU). The CSA accumulator includes a first input for receiving a processing signal and a second input for receiving a previous result of the CSA accumulator. The CSA accumulator is used for processing carry-save addition. The first register includes an input coupled to the CSA accumulator and an output coupled to the second input of the CSA accumulator. The CPA adder is coupled to the first register. The CPA adder is used for processing an addition operation on all carries outputted from the first register. The central processing unit includes an input coupled to the CPA adder and an output for outputting an output signal comprising processed image measurement data.

The claimed invention also provides a method for improving image quality with a Carry-Save-Add (CSA) accumulator. The method includes processing carry-save addition on image measurement data of a pixel once within a predetermined clock period, and processing carry-pass addition once on all carries generated by processing carry-save addition when a vertical synchronization signal is active.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
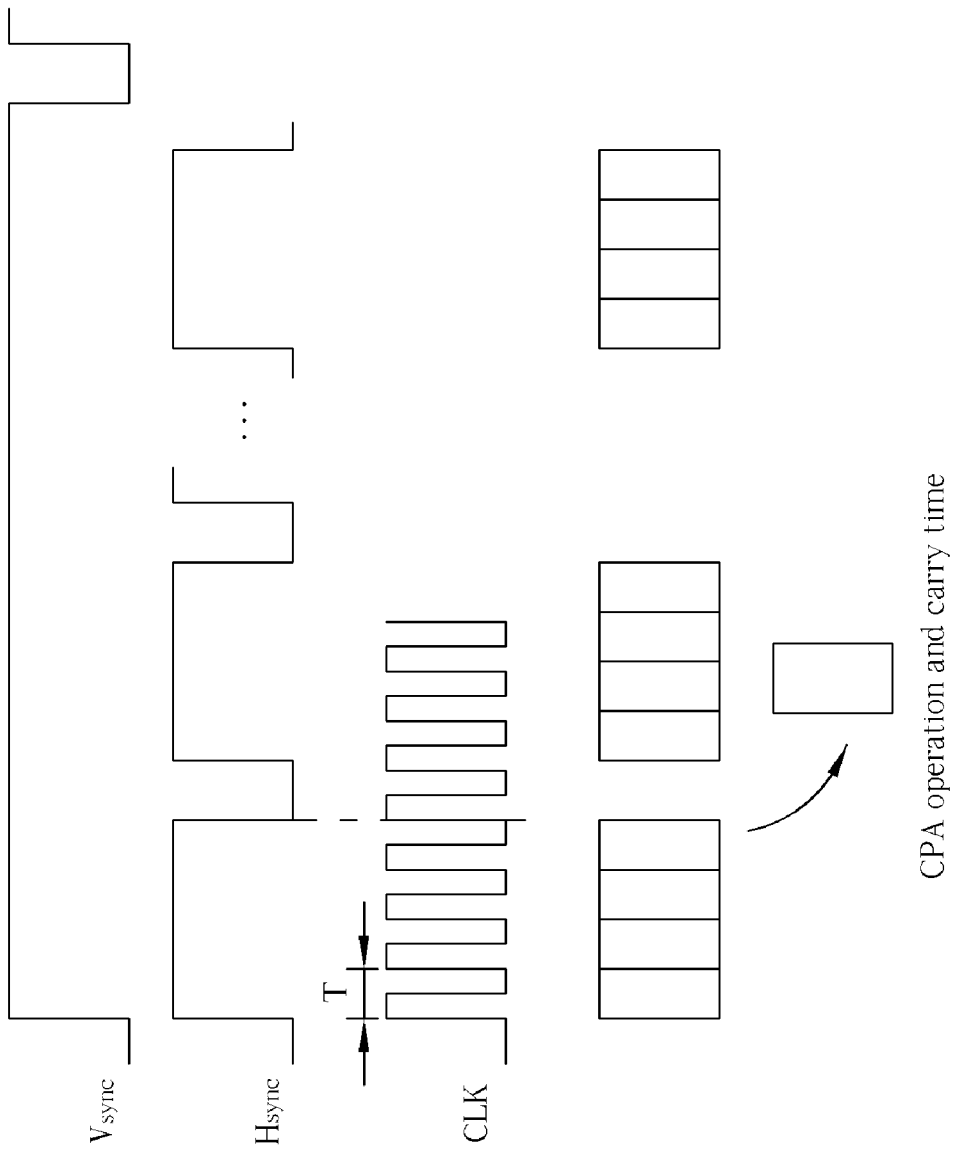
FIG. 1 is a diagram of an image processing device for processing image measurement data according to the prior art.
Figure 2:
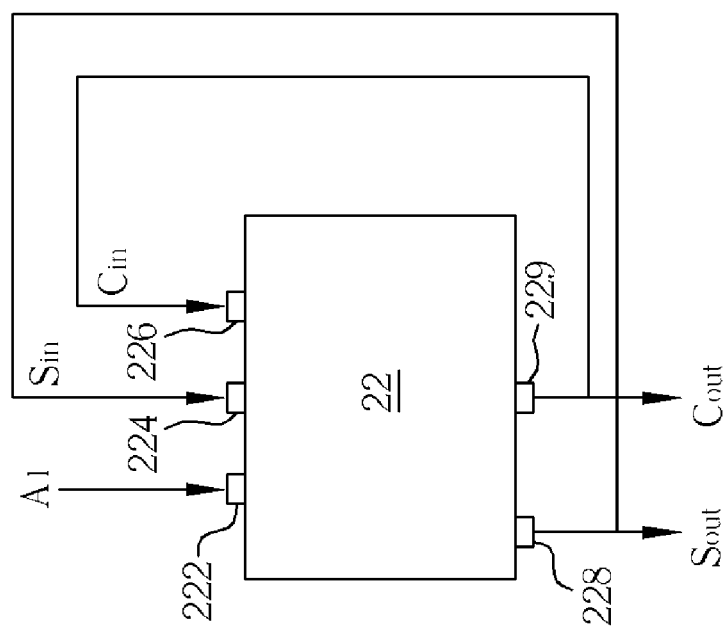
FIG. 2 is a diagram of a Carry-Propagate-Adder (CPA).
Figure 3:
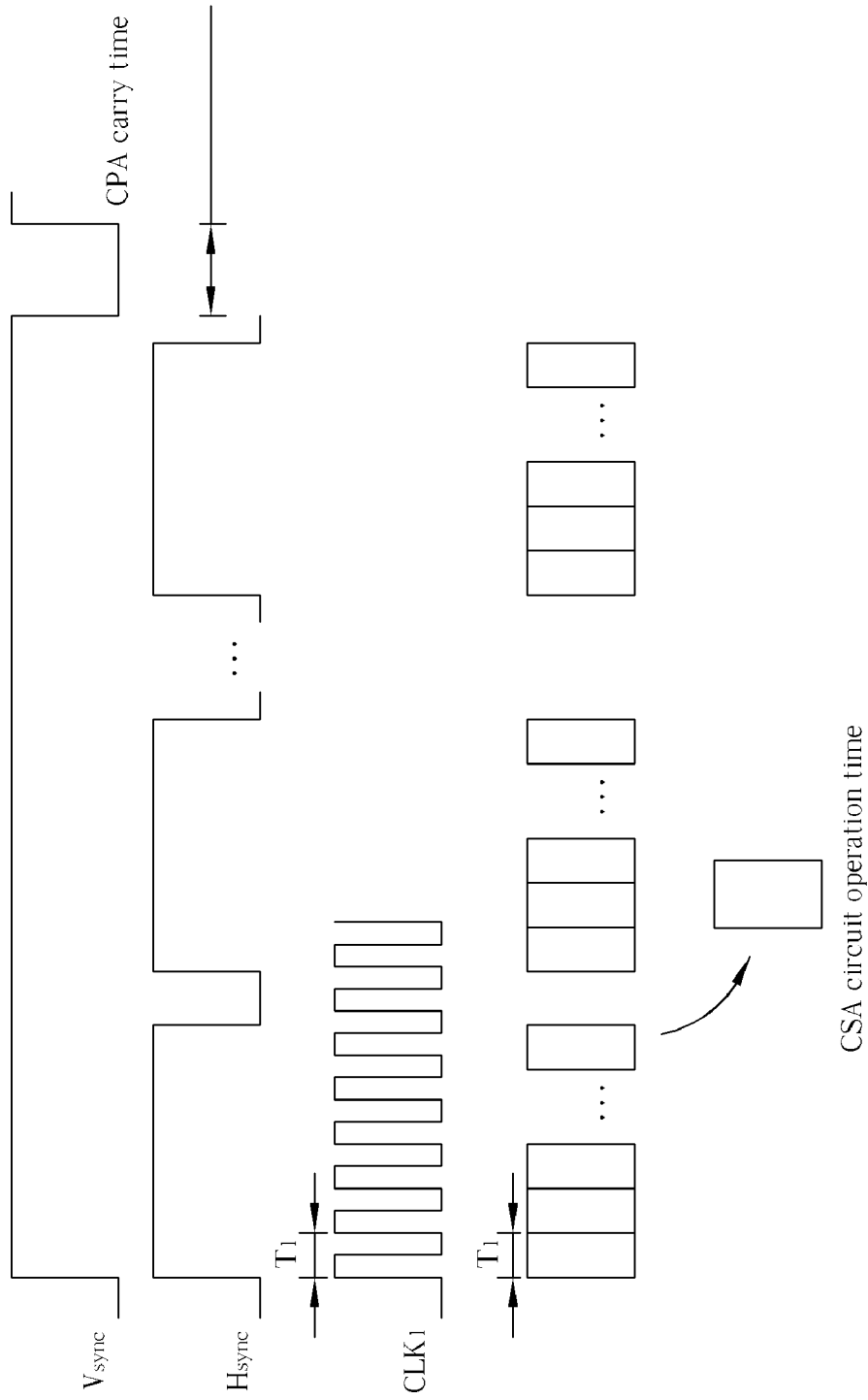
FIG. 3 is a diagram of an image processing device for processing image measurement data according to an embodiment of the present invention.

Please refer to FIG. 3, which is a diagram of an image processing device for processing image measurement data according to the present invention. After scanning one scan line, the image processing device outputs a horizontal synchronization signal Hsync (the signal Hsync is logic low). After scanning a frame, the image processing device outputs a vertical synchronization signal Vsync (the signal Vsync is logic low). A clock $CLK_1$ is a signal with a clock period $T_1$. In one clock period, when scanning one scan line (the signal Hsync is logic high), the image processing device processes carry-save addition (CSA) on image measurement data of a pixel once, and generates a sum and a carry output within the clock period $T_1$. During a following clock period $T_1$, the image processing device processes a carry-save addition once, without adding a carry input from a preceding adder. The image processing device processes carry-pass-addition once on all carry outputs generated by processing carry-save addition when the vertical synchronization signal Vsync is active (the signal Vsync is logic low). As shown in FIG. 3, utilizing the CPA carry time required in the prior art to process a complete carry-save addition, the present invention can calculate more image measurement data. Therefore, comparing the image processing device of the present invention with the prior art, the image processing device in the present invention can process more image measurement data within a same period of time.

Figure 4:
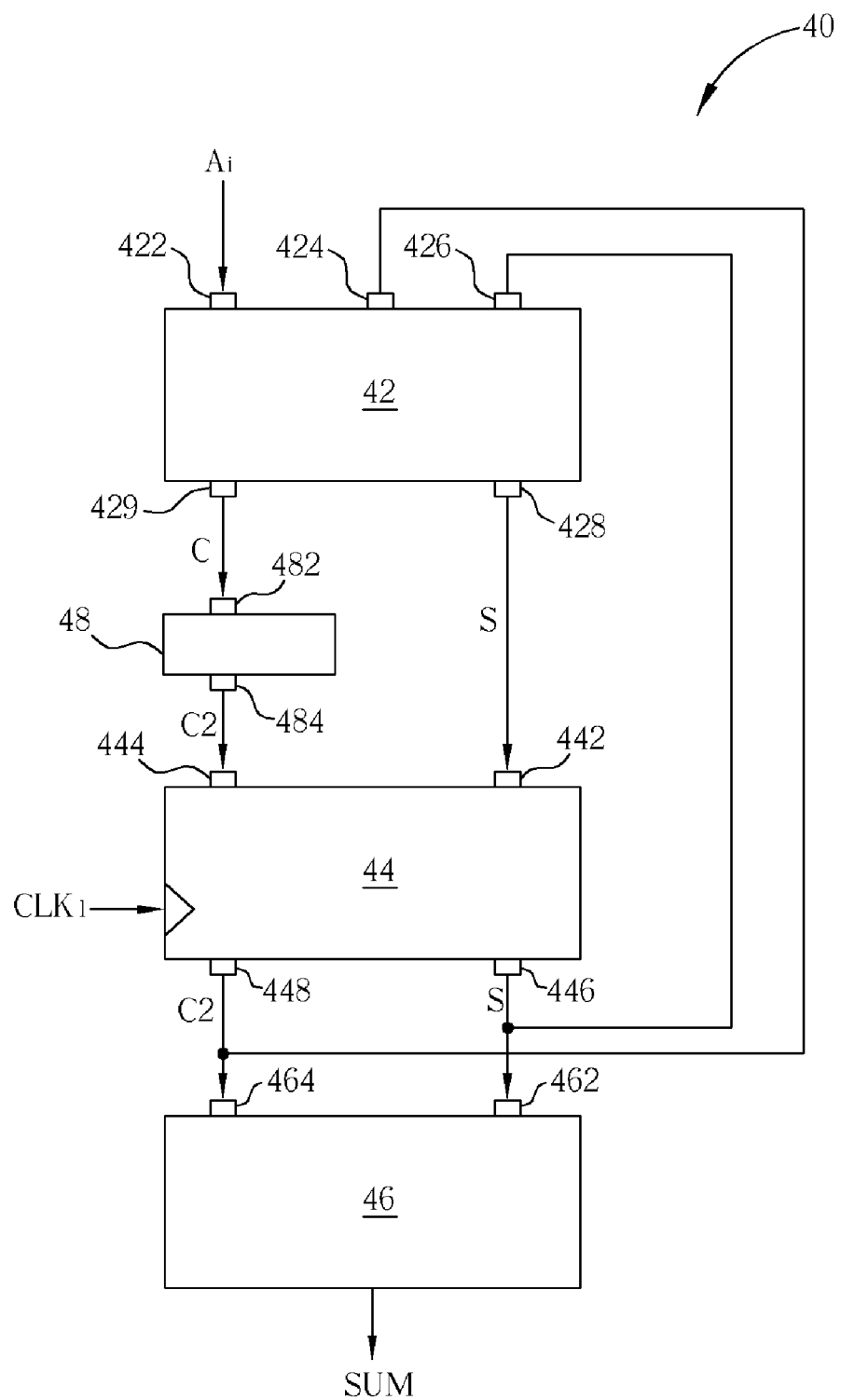
FIG. 4 is a diagram of a circuit utilizing a Carry-Save-Add Accumulator according to the present invention.

Please refer to FIG. 4, which is a diagram of a circuit 40 utilizing a carry-save-add accumulator according to the present invention. The circuit 40 includes a carry-save-add accumulator 42, a D Flip-Flop 44, a carry-propagate-adder 46, and a shifter 48. The carry-save-add accumulator 42 includes three inputs. A first input 422 of the carry-save-add accumulator 42 is used for receiving a summand $A_1$, a second input 424 is coupled to a second output 448 of the D Flip-Flop 44, and a third input 426 is coupled to a first output 446 of the D Flip-Flop 44. The carry-save-add accumulator 42 includes two outputs. A first output 428 of the carry-save-add accumulator 42 is used for outputting a sum output S, and a second output 429 is used for outputting a carry output C. An input 482 of the shifter 48 is coupled to the second output 429 of the carry-save-add accumulator 42 for receiving the carry output C. The shifter 48 is used for doubling the carry output C, adding one bit "0" behind the carry output C and outputting a second carry output C2. A first input 442 of the D Flip-Flop 44 is coupled to the first output 428 of the carry-save-add accumulator 42 for receiving the sum output S, and a second input 444 of the D Flip-Flop 44 is coupled to an output 484 of the shifter 48 for receiving the second carry output C2. A clock $CLK_1$ is a signal with a clock period $T_1$. The D Flip-Flop 44 outputs its result to the outputs 446 and 448 only after one clock period $T_1$ as passed. The carry-propagate-adder 46 includes two inputs. A first input 462 of the carry-propagate-adder 46 is coupled to the first output 446 of the D Flip-Flop 44 for receiving the sum output S, and a second input 464 of the carry-propagate-adder 46 is coupled to the second output 448 of the D Flip-Flop 44 for receiving the second carry output C2. The carry-propagate-adder 46 is used for adding up data received by these two inputs 462 and 464 to generate a sum output SUM.

Figure 5:
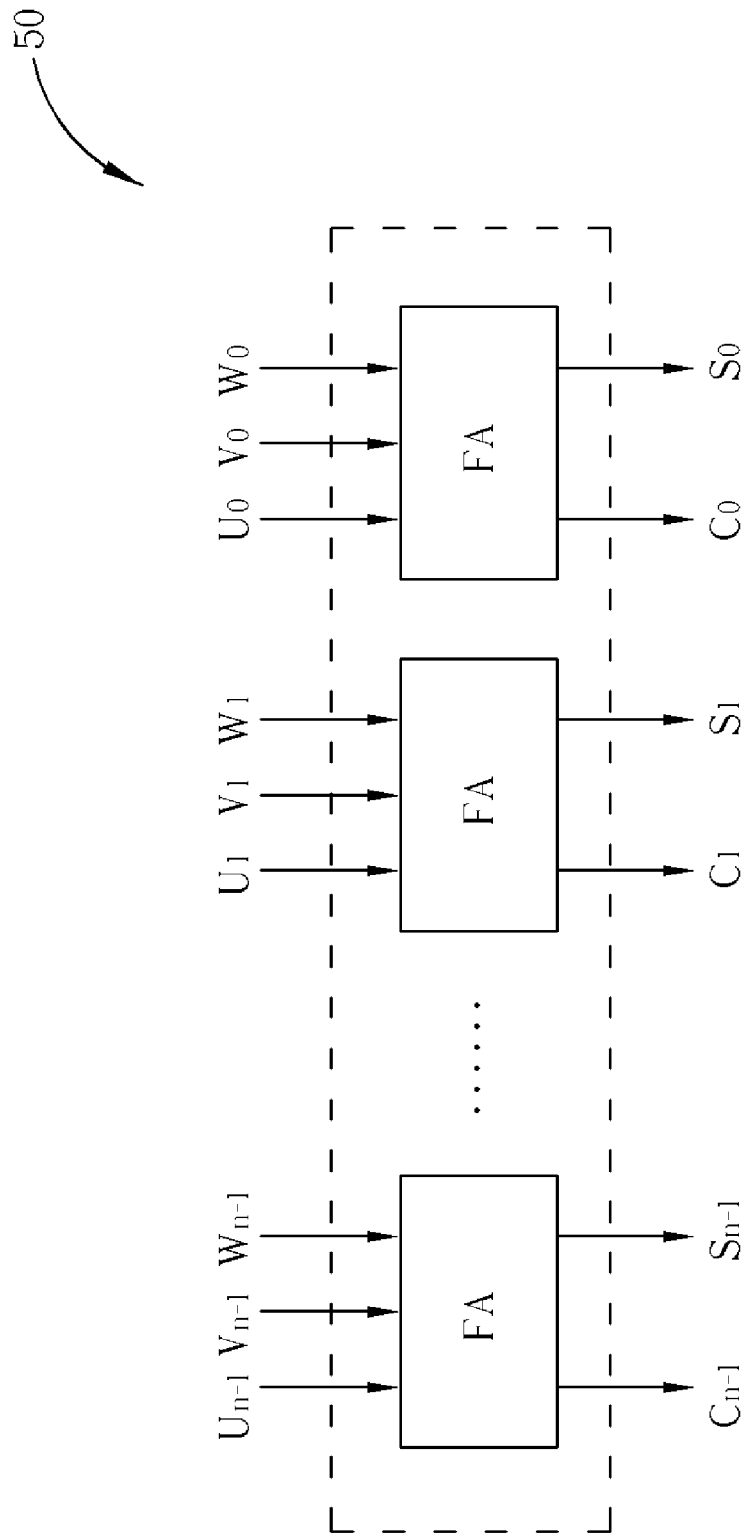
FIG. 5 is a diagram of a Carry-Save-Add Accumulator.

Please refer to FIG. 5. FIG. 5 is a diagram of a carry-save-add accumulator 50. The carry-save-add accumulator 50 is an n-bit adder which includes n full adders FA. Each full adder FA includes three inputs for receiving three signals $U_i$, $V_i$ and $W_i$ individually. Each full adder FA is used for processing addition on the three signals $U_i$, $V_i$ and $W_i$ received by the three inputs. A logic operation of sum outputs $S_0$-$S_{n-1}$ is $S_i = U_i \wedge V_i \wedge W_i$, which is processing a "NOR" operation on data received from these three inputs. A logic operation of carry outputs $C_0$-$C_{n-1}$ is $C_i = U_i V_i | V_i W_i | U_i W_i$, which is processing an "AND" operation two-by-two and finally processing an "OR" operation on results of the "AND" operation. The value is in a range from 0 to (n−1).

Figure 6:
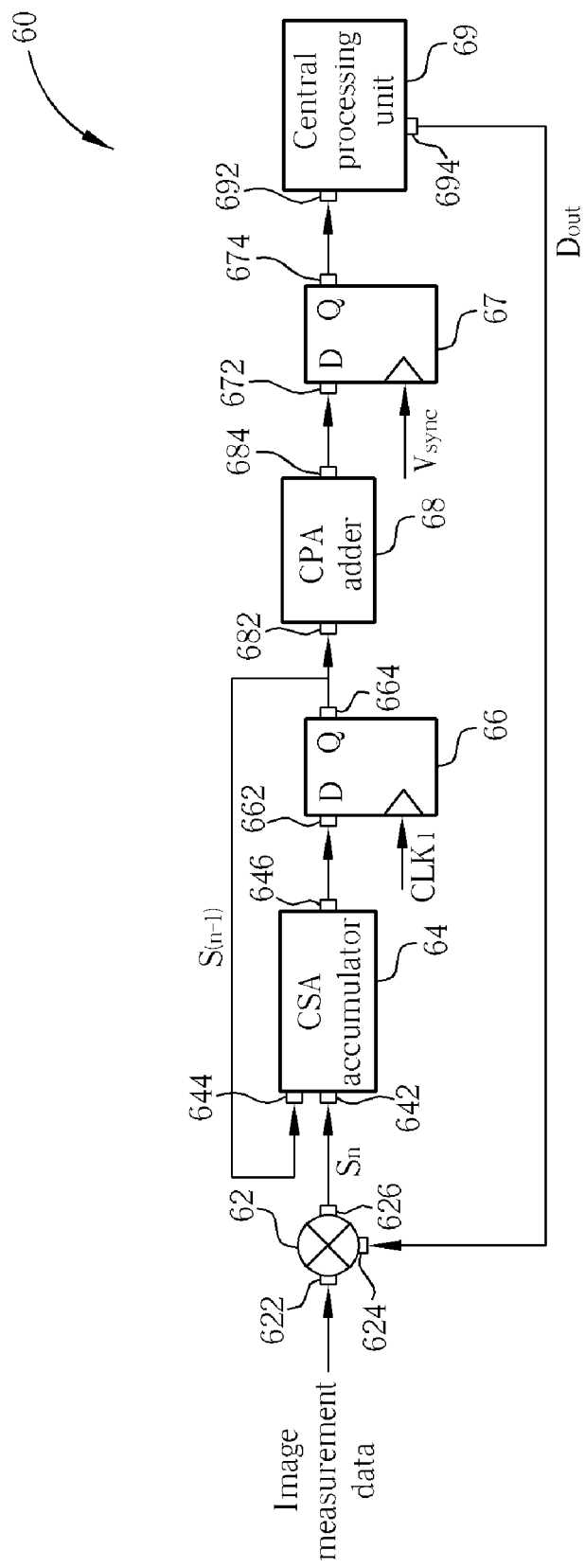
FIG. 6 is a diagram of an image processing device according to an embodiment of the present invention.

Please refer to FIG. 6. FIG. 6 is a diagram of an image processing device 60 according to the present invention. The image processing device 60 includes an adjuster 62, a carry-save-add accumulator 64, a first register 66, a carry-propagate-adder 68, a second register 67, and a central processing unit 69. The adjuster 62 includes a first input 622 for receiving a set of image measurement data and a second input 624 coupled to an output 694 of the central processing unit 69 for receiving an output signal $D_{out}$. The adjuster 62 is used for generating a processing signal $S_n$ according to the output signal $D_{out}$ and the set of image measurement data. The carry-save-add accumulator 64 includes a first input 642 coupled to an output 626 of the adjuster 62 for receiving the processing signal $S_n$ and a second input 644 for receiving a previous result $S_{(n-1)}$ outputted from the carry-save-add accumulator 64. The carry-save-add accumulator 64 is used for processing a carry-save-addition operation on data received from the first input 642 and the second input 644. The first register 66 includes an input 662 and an output 664. The input 662 of the first register 66 is coupled to an output 646 of the carry-save-add accumulator 64 and the output 664 of the first register 66 is coupled to a second input 644 of the carry-save-add accumulator 64. The first register 66 can be a D Flip-Flop and has a control end for receiving the clock $CLK_1$. The clock $CLK_1$ is a cyclic signal with a clock period $T_1$. The first register 66 outputs its result to the output 664 only after one clock period $T_1$ as passed. An input 682 of the carry-propagate-adder 68 is coupled to the output 664 of the first register 66 for receiving a carry from the first register 66. The carry-propagate-adder 68 is used for processing an addition operation on all carries. The carry-propagate-adder 68 processes an addition operation and outputs a result of the addition operation through the output 684 only when one clock period $T_1$ has passed. The second register 67 includes a first input 672 and an output end 674. The first input 672 of the second register 67 is coupled to an output 684 of the carry-propagate-adder 68, and the output 674 of the second register 67 is coupled to an input 692 of the central processing unit 69. The second register 67 outputs its result to the output 674 only when the vertical synchronization signal Vsync is active (the signal Vsync is logic low). The central processing unit 69 includes an input 692 and an output 694. The input 692 of the central processing unit 69 is coupled to the output 674 of the second register 67, and the output 694 of the central processing unit 69 is coupled to the second input 624 of the adjuster 62 for processing the image measurement data which is calculated and generating the output signal $D_{out}$. The image processing device 60 is a digital camera or a digital video camera. Wherein the image measurement data comprises an image information selected from the group essentially consisting of a luminance information, a gradient information and a chrominance information of an image pixel. In digital cameras and digital video cameras, processing the calculated image measurement data includes performing an image auto white balance (AWB) process, an image auto focus (AF) process, or an image exposure process.

Figure 7:
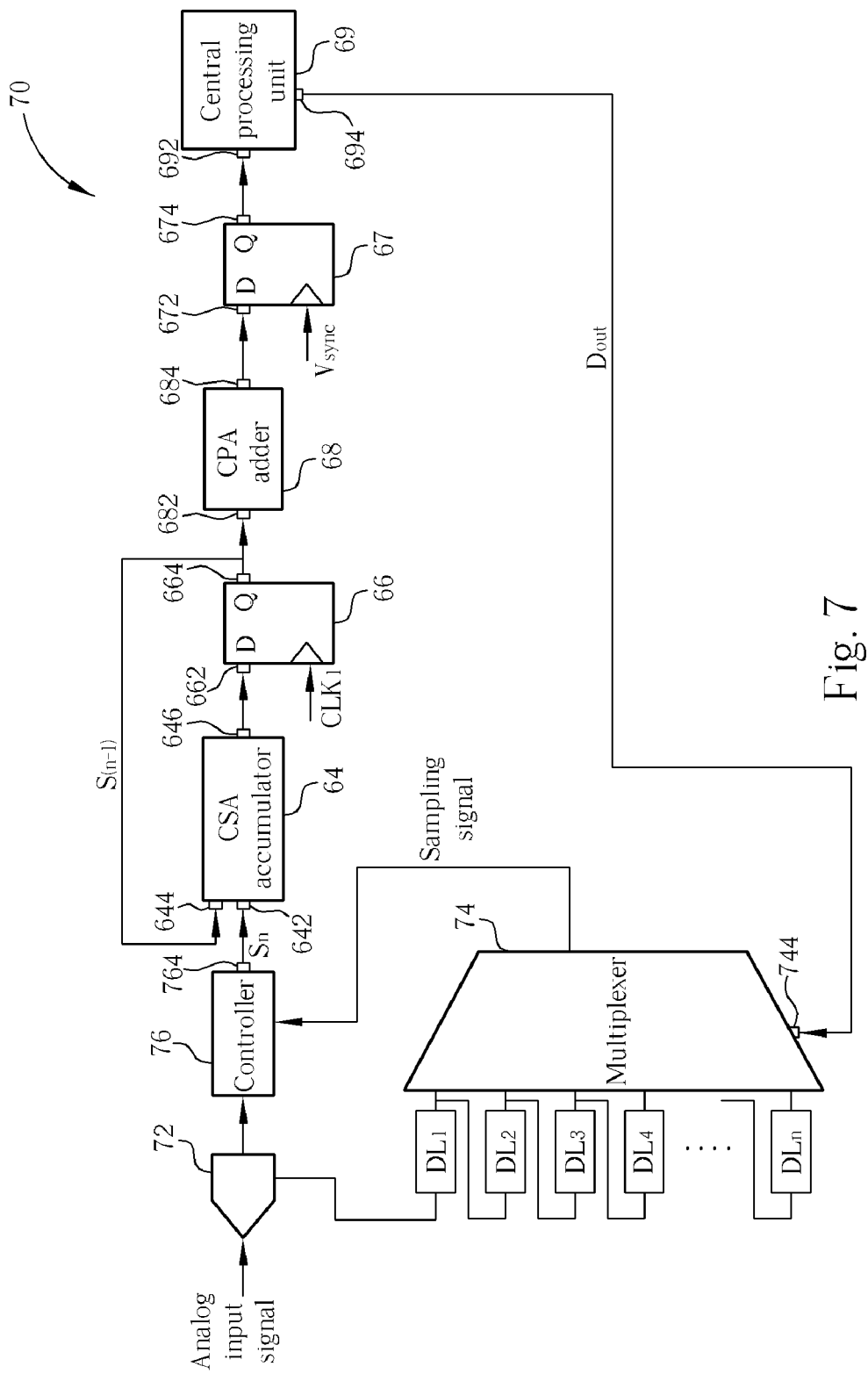
FIG. 7 is a diagram of another image processing device according to an embodiment of the present invention.

Please refer to FIG. 7, which is a diagram of another image processing device 70 according to the present invention. The image processing device 70 includes an analog-to-digital converter 72, a plurality of delays $DL_1$-$DL_n$, a carry-save-add accumulator 64, a first register 66, a carry-propagate-adder

68, a second register 67, a multiplexer 74, a controller 76, and a central processing unit 69. The analog-to-digital converter 72 is used for converting a received analog input signal into digital data. The plurality of delays $DL_1$-$DL_n$ are coupled to the analog-to-digital converter 72. Each delay $DL_1$-$DL_n$ is used to postpone the digital data by a predetermined clock period. For example, if there are fifteen total delays in a series connection, each delay postpones the digital data by one-sixteenth of the predetermined clock period. Therefore, the postpone time of the predetermined clock period is controlled by controlling a number of delays in the series connection. Further, phase delay of the clock period is also controlled by these delays. This phase delay technology is common enough knowledge to omit unnecessary details.

Please continue to refer to FIG. 7. The multiplexer 74 is coupled to the plurality of delays $DL_1$-$DL_n$ and the central processing unit 69. The multiplexer 74 includes a control end 744. The multiplexer 74 is used to generate a sampling signal for sampling the digital data outputted from the analog-to-digital converter 72 according to a signal received at the control end 744. The controller 76 is coupled to the analog-to-digital converter 72, the multiplexer 74, and the carry-save-add accumulator 64. The controller 76 is used for sampling the digital data to generate the processing signal $S_n$ according to the sampling signal. The carry-save-add accumulator 64 includes a first input 642 coupled to an output 764 of the controller 76 for receiving the processing signal $S_n$, and a second input 644 for receiving the previous result $S_{(n-1)}$ outputted from the carry-save-add accumulator 64. The carry-save-add accumulator 64 is used for processing a carry-save addition operation on data received from these two inputs 642 and 644. The first register 66, the carry-propagate-adder 68, and the second register 67 are similar to the first register 66, the carry-propagate-adder 68, and the second register 67 described in FIG. 6. The central processing unit 69 includes an input 692 and an output 694. The input 692 of the central processing unit 69 is coupled to the output 674 of the second register 67, and the output 694 of the central processing unit 69 is coupled to the control end 744 of the multiplexer 74. The central processing unit 69 is used for processing the image measurement data after calculation and generating the output signal $D_{out}$. The image processing device 70 is a liquid crystal display (LCD). In the liquid crystal display, the image measurement data includes gradient data of an image pixel. Adjusting an image based on the gradient data of image pixels can provide better image quality.

The above-mentioned embodiments illustrate, but do not limit, the present invention. The image processing devices 60 and 70 are not restricted to being a digital camera, a digital video camera, or a liquid crystal display, but could be any other image device. A speed of processing image measurement data is increased by the prevent invention. The image measurement data is not limited to data from an image auto white balance (AWB) process, an image auto focus (AF) process, an image exposure process, luminance data, gradient data, or chrominance data of an image pixel. The image measurement data could be other image measurement data which is not restricted to the embodiments of the present invention.

In conclusion, the present invention provides an image processing device and related method for improving image quality with a Carry-Save-Add (CSA) accumulator. A carry-save addition operation is performed once on the image measurement data of an image pixel during a predetermined clock period. A carry-propagate addition operation is performed once on all carries generated by processing the carry-save addition operation when a vertical synchronization signal is active. Furthermore, the present invention can process tens to hundreds of times the amount of image measurement data by saving the carry time. This helps to improve image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing device for improving image quality with a Carry-Save-Add (CSA) accumulator, the image processing device comprising:
    a CSA accumulator including a first input for receiving a processing signal and a second input for receiving a previous result of the CSA accumulator, the CSA accumulator used for processing a carry-save addition;
    a first register including an input coupled to the CSA accumulator and an output coupled to the second input of the CSA accumulator;
    a Carry-Propagate-Adder (CPA) coupled to the first register, the CPA used for processing an addition operation on all carries in a frame during a vertical blank period of a vertical synchronization signal;
    a second register including an input coupled to the CPA, a control end for receiving the vertical synchronization signal and an output for outputting a result of the CPA; and
    a central processing unit (CPU) including an input coupled to the second register and an output for outputting an output signal comprising a processed image measurement data.

2. The image processing device of claim 1 further comprising:
    an adjuster including a first input for receiving an image measurement data, a second input coupled to the output of the central processing unit for receiving the output signal, and an output coupled to the first input of the CSA accumulator, the adjuster used for generating the processing signal from the output signal and the image measurement data.

3. The image processing device of claim 2 wherein the image processing device is a digital camera.

4. The image processing device of claim 2 wherein the image processing device is a digital video camera.

5. The image processing device of claim 2 wherein the image measurement data comprises an image information selected from a group essentially consisting of a luminance information, a gradient information and a chrominance information of an image pixel.

6. The image processing device of claim 1 further comprising:
    an analog-to-digital converter (ADC) for converting a received signal into digital data;
    a plurality of delays coupled to the ADC, each delay used for postponing the digital data by a predetermined clock period;
    a multiplexer coupled to the plurality of delays and the central processing unit, the multiplexer used for generating a sampling signal according to the output signal; and
    a controller coupled to the analog-to-digital converter, the multiplexer, and the CSA accumulator, the controller used for sampling the digital data to generate the processing signal according to the sampling signal.

7. The image processing device of claim 6, wherein the image processing device is a liquid crystal display (LCD).

* * * * *